(No Model.) 5 Sheets—Sheet 1.
M. F. MYERS & W. C. CHOATE.
CORN HARVESTER.
No. 575,524. Patented Jan. 19, 1897.
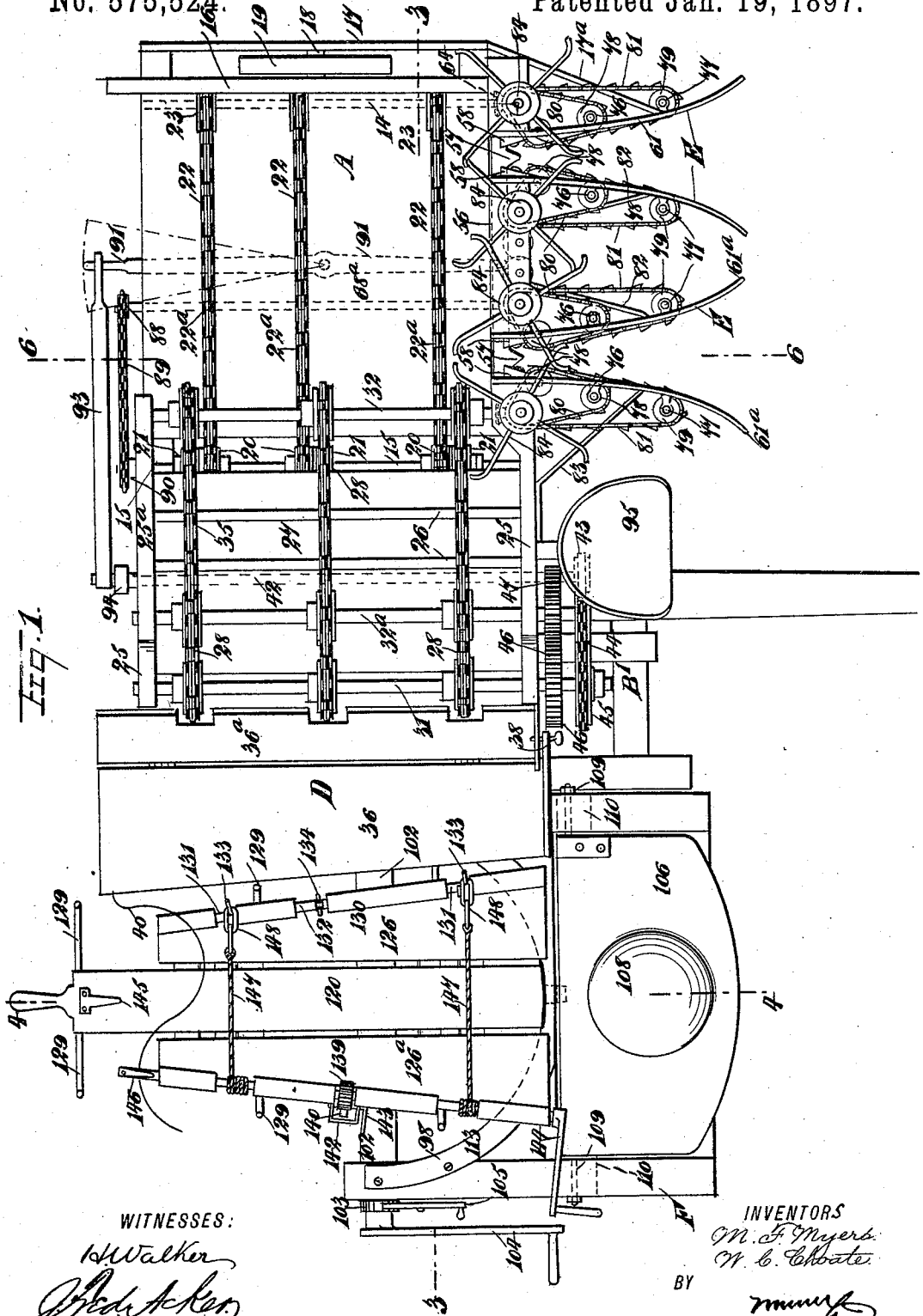
WITNESSES:
H. Walker
J. Fred Acker
INVENTORS
M. F. Myers
W. C. Choate
BY
ATTORNEYS

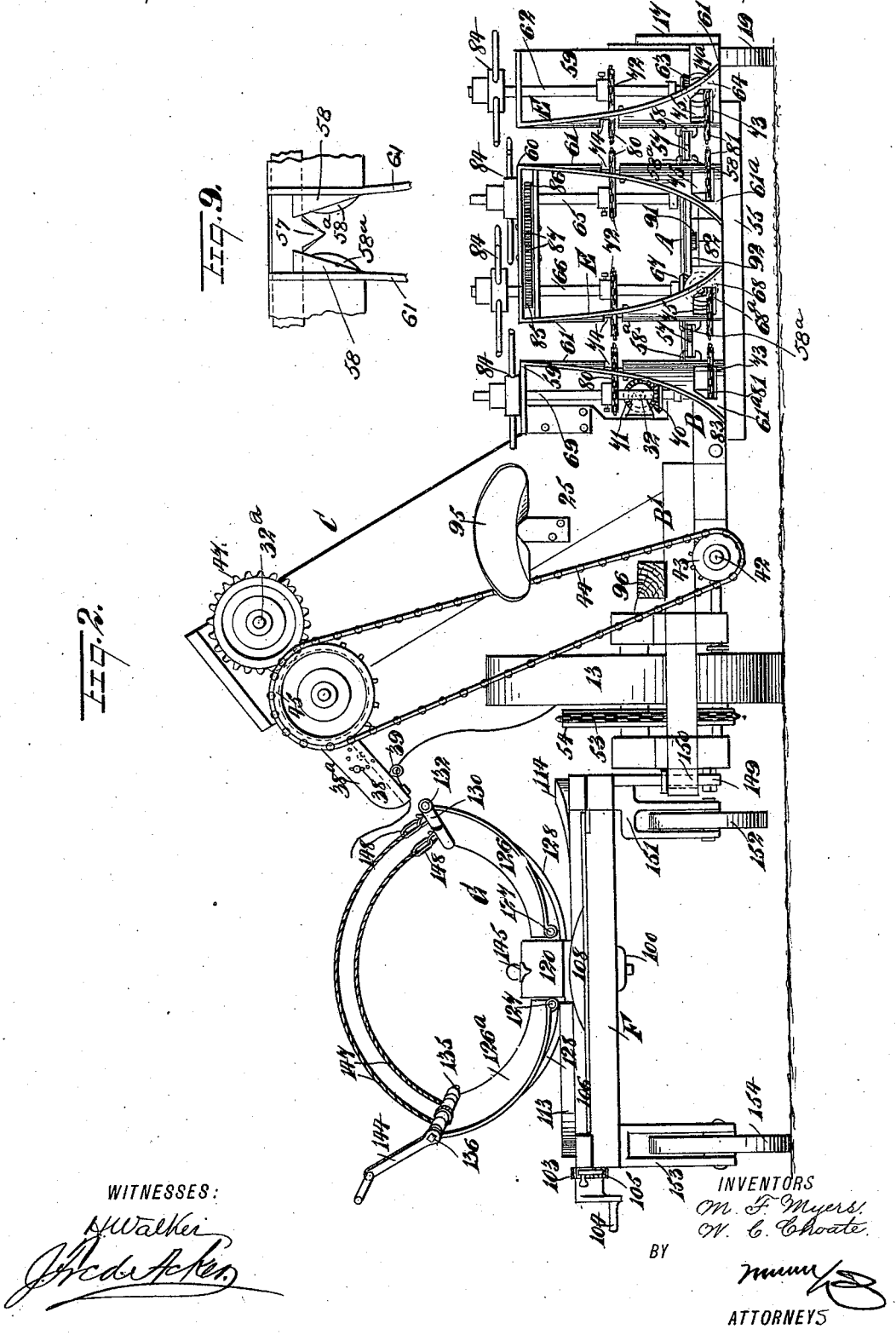

(No Model.) 5 Sheets—Sheet 3.
M. F. MYERS & W. C. CHOATE.
CORN HARVESTER.
No. 575,524. Patented Jan. 19, 1897.
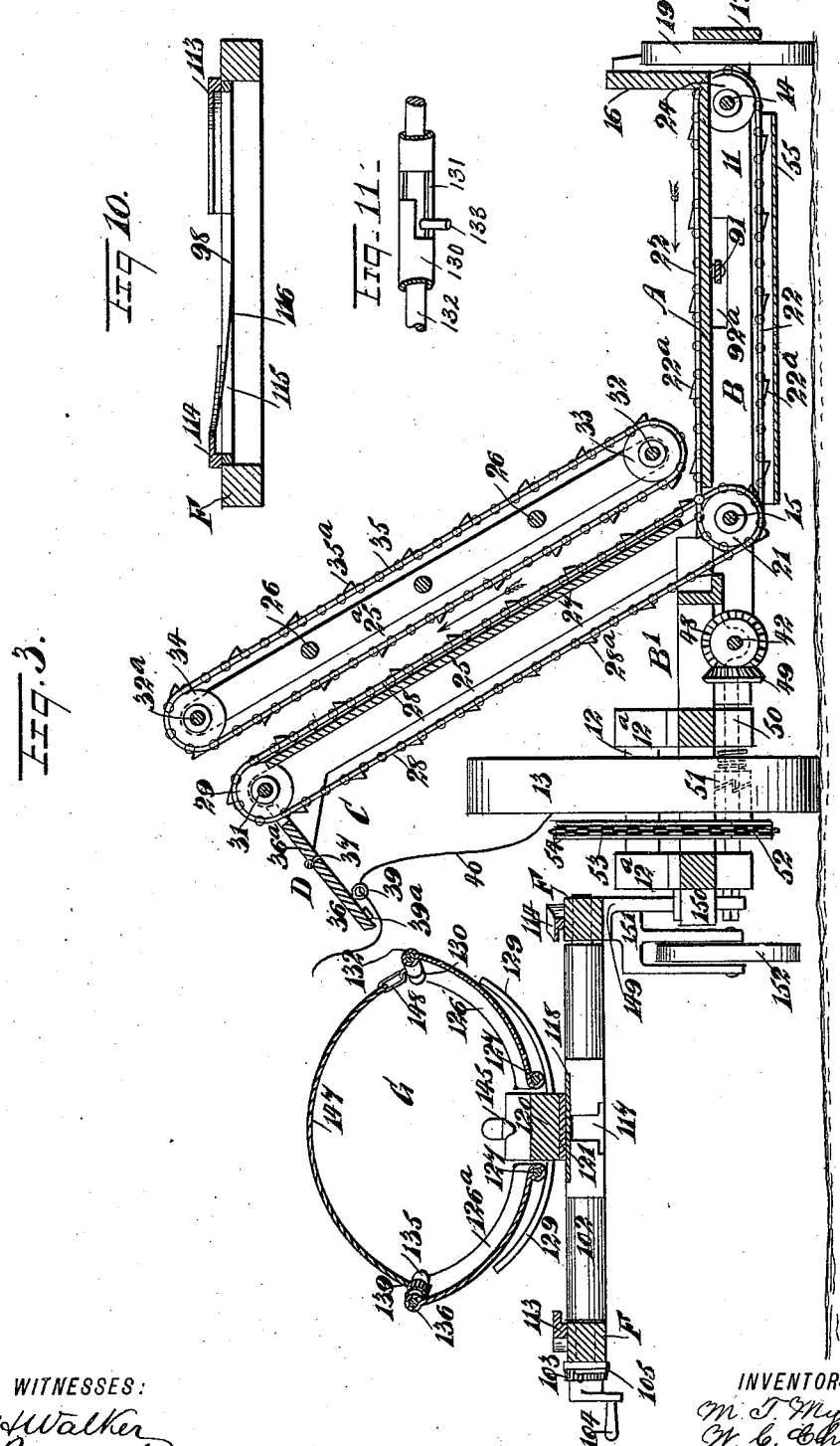
WITNESSES:
H. Walker
J. Fred Acker
INVENTORS
M. F. Myers
W. C. Choate
BY
[signature]
ATTORNEYS
THE NORRIS PETERS CO., PHOTO-LITHO., WASHINGTON, D. C.

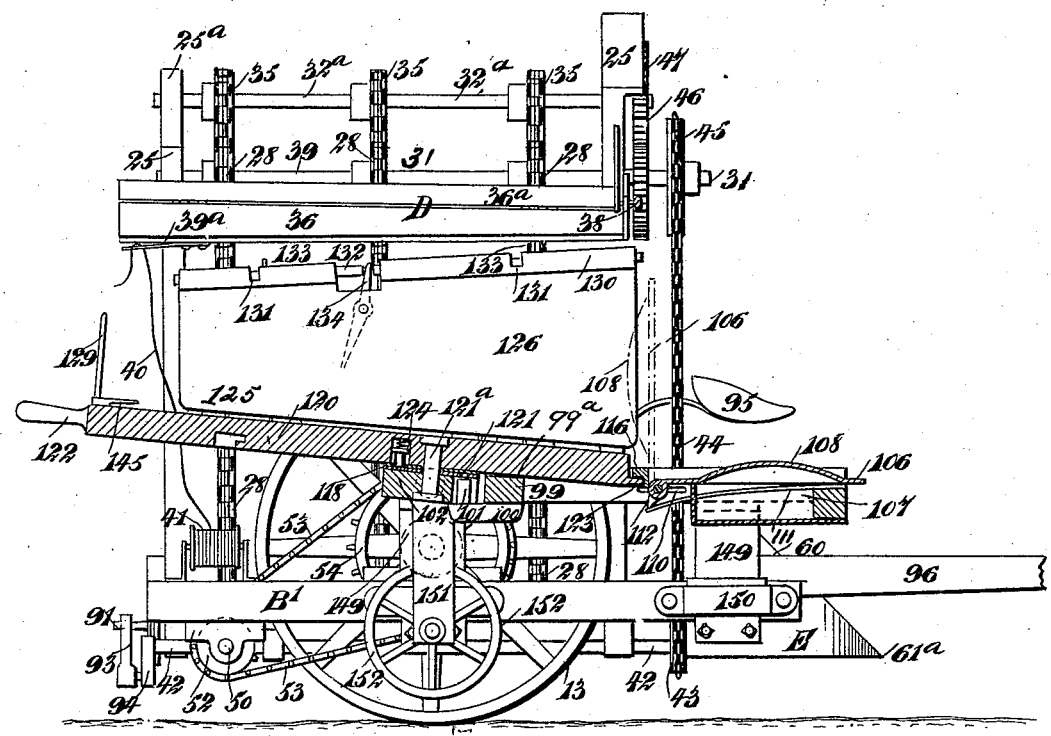
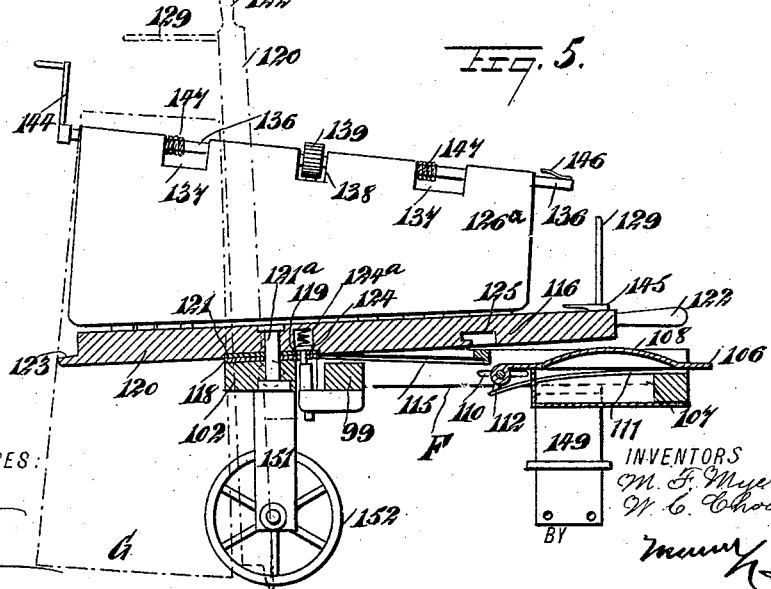

(No Model.) 5 Sheets—Sheet 5.
M. F. MYERS & W. C. CHOATE.
CORN HARVESTER.
No. 575,524. Patented Jan. 19, 1897.
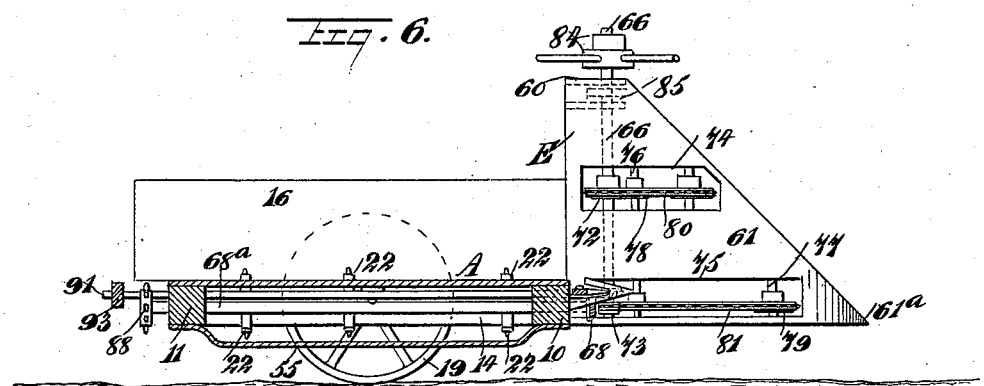
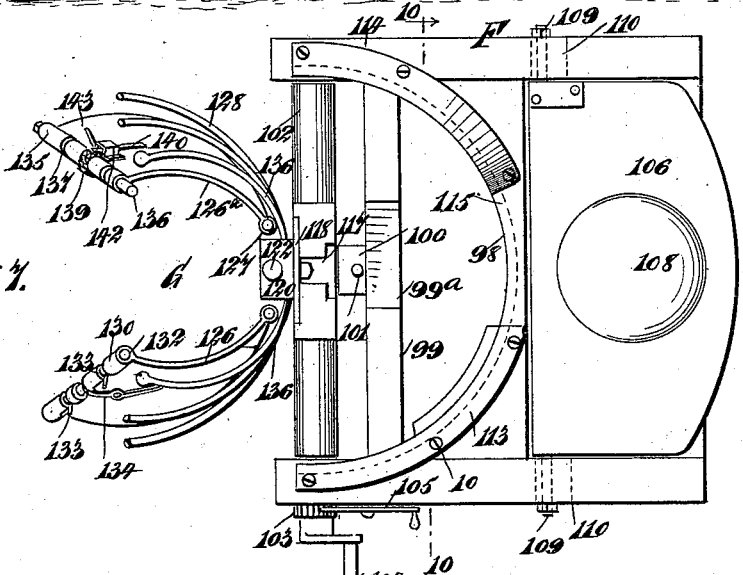
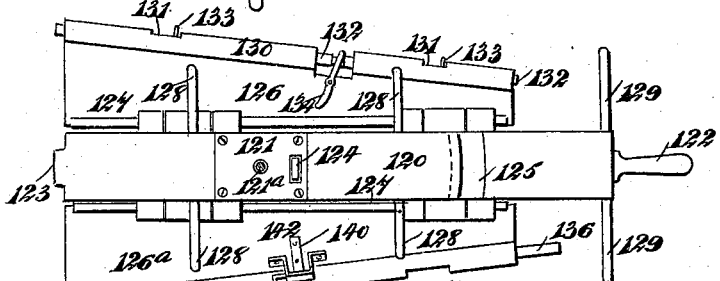
WITNESSES:
INVENTORS
M. F. Myers
W. C. Choate
BY
ATTORNEYS

UNITED STATES PATENT OFFICE.

MILLARD F. MYERS, OF GREENVILLE, AND WILLIAM C. CHOATE, OF COLUMBUS, OHIO.

CORN-HARVESTER.

SPECIFICATION forming part of Letters Patent No. 575,524, dated January 19, 1897.

Application filed February 7, 1896. Serial No. 578,308. (No model.)

*To all whom it may concern:*

Be it known that we, MILLARD F. MYERS, of Greenville, in the county of Darke, and WILLIAM C. CHOATE, of Columbus, in the county of Franklin, State of Ohio, have invented a new and useful Improvement in Corn-Harvesters, of which the following is a full, clear, and exact description.

Our invention relates to an improvement in corn-harvesters; and the object of the invention is to provide a harvester of this description which will be exceedingly simple, durable, and economic in its construction and capable of being operated in an exceedingly simple and convenient manner to harvest the stalks of corn from one or simultaneously from a number of rows.

Another object of this invention is to provide a shocker for the harvester, so constructed that the weight of the completed shock will automatically act to dump the shocker, whereby the stalks are virtually shocked by their own weight.

Another object of the invention is to so construct the shocker and the support therefor that the shocks of corn may be given a concaved formation at the central portion of their butts, whereby the shocks will stand more firmly on the ground, and whereby also the shocks may be so constructed that the butts or bottoms will be more or less inclined, enabling the shocks to stand firmly upright on a hillside.

Another object of this invention is to provide what may be termed a "false" shocker, being arranged to receive the cornstalks from the elevator directing them into the main shocker; but the false shocker is also so constructed that it may be made to retain a greater or a less number of cornstalks, enabling the driver of the machine to proceed with the said machine while a completed shock is being tied and finished preparatory to dumping, since the false shocker will serve as a reservoir for the stalks of corn cut and conveyed upward during that period of time.

Another object of the invention is to provide a single drive-shaft for the platform conveyer and the elevator, thereby dispensing with a number of shafts and pulleys on the body of the machine and materially lessening the weight of the machine and economizing in its construction. The machine is also constructed in such manner that the rear ends of the platform conveyer and elevator are open, thereby permitting exceedingly long stalks to be handled as readily as very short ones.

It is another object of the invention to provide an exceedingly simple and effective form of a cutting device, and reels acting to feed the stalks of corn to the cutting devices, holding them in upright position during the operation of cutting, and, furthermore, guides are provided for the aforesaid cutting devices, so arranged as to pick up any corn that may have been blown down or otherwise depressed and conduct the said corn, together with the upright stalks, to the reels, compressing the stalks while being fed to the cutters.

Another object of the invention is to provide a simple, effective, and quickly-applied means for tying the shocks in the shocker and for releasing the shocks when the shocker has been dumped.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 1 is plan view of the harvester and attached shocker, illustrating the shocker as in position to receive the stalks of corn. Fig. 2 is a front elevation of the harvester, the shocker being in the position shown in Fig. 1. Fig. 3 is a longitudinal vertical section through the shocker and the harvester, the section being taken substantially on the line 3 3 of Fig. 1. Fig. 4 is a transverse vertical section through the shocker, showing the right-hand end of the harvester in side elevation, the section being taken substantially on the line 4 4 of Fig. 1. Fig. 5 is a vertical section through the central portion of the shocker, illustrating the shocker in the position it occupies just prior to being dumped. Fig. 6 is a transverse vertical section through the platform portion of the harvester, the section being taken practically on the line 6 6 of Fig. 1. Fig. 7 is a plan view of the shocker and its support, the shocker being in its dumped position. Fig. 8 is a bottom plan view of the shocker or shocker-cradle removed from its platform. Fig. 9 is a detail view illustrating knives stationarily located upon the sickle-guards of the reciprocating knives or sickles; Fig. 10 is a section through the shocker-platform, taken on the line 10 10 of Fig. 7, and Fig. 11 is a detail view illustrating the slots in one of the shocker jaws or sections.

In carrying out the invention the platform A of the harvester is preferably made of metal, although it may be made of any desired material, and it is supported upon the platform-frame B, which frame at its right-hand end is attached to the main wheel-frame B'. The axle 12, carrying the main or driving wheel 13, is journaled in bearings 12ª, located upon the upper central portion of the main wheel-frame B', as shown best in Figs. 2 and 3.

Two shafts 14 and 15 are journaled beneath the platform in the front and rear supporting-beams 10 and 11 of the platform-frame B. The shaft 14 is a counter-shaft and is located entirely beneath the platform, at or near the left-hand end of the same, while the shaft 15, which is a drive-shaft, is located to the right of the inner end of the platform A, yet somewhat adjacent thereto. An upright guard 16 is firmly secured at the left-hand end of the platform A, extending practically from the front to the rear of the same, and a strap 17 is attached to the outer face of the said guard, preferably having a forward extension 17ª, which extends beyond the front of the platform at its left-hand end, having an inclination in direction of the opposite end of the platform, and between the said strap and the guard 16 a shaft 18 is journaled, upon which a supporting-wheel 19 is loosely mounted, and the said wheel 19, which is adapted to support the left-hand end of the machine, is much smaller than the driving-wheel 13.

Two sets of pulleys, preferably sprocket wheels or pulleys 20 and 21, are firmly secured upon the drive-shaft 15. These sprocket-wheels are arranged, preferably, in pairs, each pair including a wheel 20 and a wheel 21, and any number of pairs may be employed, the number being regulated according to the width of the platform A and an elevator C, to be hereinafter described. The carrying or conveyer chains 22 or their equivalents are made to pass over the pulleys 20 on the drive-shaft and over the top and along the bottom of the machine-platform A, passing through openings 23, made in the platform near the guards 16, and the said conveyer chains or belts likewise pass over guide-pulleys 24, which are secured upon the counter-shaft 14, as illustrated in Fig. 3.

Each conveyer chain or belt is preferably provided with a number of projections 22ª, which may be in the nature of inclined blocks, as illustrated in the drawings, or the said projections may be in the nature of pins, and these pins are placed upon the outer faces of the conveyer-belts and are adapted to carry the cornstalks falling on the platform A to the right-hand end thereof and to the bottom of the aforesaid elevator C.

The frame of the elevator preferably consists of a side piece 25, located at the front of the machine, and two side pieces 25 and 25ª, located at the rear of the machine and spaced a predetermined distance apart, as shown also in Fig. 3, the rear side piece 25ª of the elevator-frame being connected with the front single side piece 25 by means of cross-bars 26 or their equivalents, firmly attached to the aforesaid side pieces, and the rear side piece 25 of the elevator-frame is connected with the forward side piece by means of a partition 27, which virtually constitutes the floor of the elevator and extends practically the entire length of the right-hand side of the frame, since the left-hand side portions of the said elevator-frame extend above the right-hand side portions, as shown best in Fig. 3.

Chain belts 28 or their equivalents are passed over the sprocket-wheels 21 on the platform drive-shaft 15 and front and back of the partition 27, the said endless chains being likewise made to pass over sprocket-wheels 29 or their equivalents, secured upon a shaft 31, journaled in the upper right-hand portions of the elevator. The chains or belts 28 are provided with projections 28ª, arranged to receive the stalks and support them on the stretches of the belts facing the platform A. The shaft 32 is journaled in the bottom of the rear side pieces 25ª of the elevator-frame and in the corresponding part of the forward side piece 25, and a parallel shaft 32ª is journaled in the upper portion of these sections of the said elevator-frame.

Sprocket-wheels 33 or their equivalents are secured upon the lower shaft 32, and corresponding wheels 34 are firmly attached to the upper shaft 32ª, and the aforesaid sprocket-wheels 33 and 34 are preferably in alinement with the sprocket-wheels 21 and 29 at the left-hand portion of the elevator-frame. Conveyer-belts 35, provided with carrying projections 35ª, are made to pass over the aforesaid sprocket-wheels 33 and 34, and these belts 35 travel at both sides of the cross-bars 26, supporting the left-hand portion of the elevator-frame. Thus it will be observed under this construction that practically a double elevator is secured, since two sets of elevator-chains are arranged opposite each other, as shown in Fig. 3, and the stalks receive support from both of these stretches as said stalks are carried upward.

It will be observed that the shaft 15 is a drive-shaft for the platform conveyer and is likewise a supporting-shaft for the main chains of the elevator, and under this construction at least one shaft is dispensed with at the bottom of the machine, simplifying and economizing in its construction.

The stalks of corn are delivered from the elevator upon a shocker-table D. This shocker-table may be termed an "auxiliary shocker," as it is arranged to hold an accumulation of stalks for a predetermined period of time. To that end the table is made in two longitudinal sections extending transversely over the main wheel-frame B', having a downward inclination. The two sections 36 and 36$^a$ are connected by hinges 37, and preferably the right-hand section is wider than the left-hand section, and when the right-hand or lower section is carried up at an angle to the upper or left-hand section the lower section 36 may be held in its adjusted position by any approved form of latch, that shown in the drawings being a pin 38, which is passed through any one of a number of apertures, as shown in Fig. 2, into registering apertures made in the other section 36$^a$, since at the forward end of each of these sections a flange 38$^a$ is provided.

An eye 39 or other form of guide is preferably secured to the bottom portion of the lower section of the auxiliary shocker, being adapted to receive the binding thread or cord 40, which is carried from a reel 41, located upon the frame of the machine at any convenient point, or the said reel may be attached to any desired portion of the machine. In order that the thread or cord 40 shall not slip from out its guide 39, a spring-clip 39$^a$ is secured to the under face of the said auxiliary shocker, as shown in Fig. 4, the thread being passed between this clip and the body portion of the shocker.

The elevator-chains and the conveyer or platform chains are driven from the driving and main supporting wheel 13. To that end a shaft 42 is journaled in suitable bearings beneath the platform-frame B, being provided at its forward end with a sprocket-wheel 43. A chain belt 44 is carried over this sprocket-wheel and over a larger wheel 45 of similar character secured upon the forward end of the elevator-shaft 31, and on this same shaft, outside of the elevator-frame, a gear 46 is firmly secured, which meshes with a second gear 47, secured upon the upper shaft 32$^a$ of the left-hand section of the elevator, as illustrated in Figs. 2 and 4. The line-shaft 42 is provided at a suitable point in its length with an attached beveled gear 48, and this gear meshes with a like gear 49, secured upon a drive-shaft 50. This drive-shaft, as illustrated in Fig. 3, is provided with a spring-controlled clutch 51, having sliding movement on the shaft, yet turning therewith. The clutch 51 is adapted for engagement with the clutch-face of a pulley 52, loosely mounted on the said drive-shaft, and the pulley 52, which is preferably a sprocket, is connected by a belt 53 with a sprocket-pulley 54 of larger size, secured on the axle 12, carrying the main supporting-wheel 13.

The clutch connection between the driving-pulley 52 and the driving-shaft is such that when the machine is drawn forward the two clutch-surfaces, which are normally in engagement, will mesh in a manner to control or turn the driving-shaft; but when the machine is backed one clutch-surface will simply slide over the face of the other, and the driving-shaft will remain still.

Any approved form of shifting device may be provided for the clutch.

A sickle-bar 56 is held to slide at the forward end of the platform A of the harvester. The said sickle-bar is provided with any desired number of knives 57, the number of knives employed being equivalent to the number of rows of corn to be cut by the machine at one operation. In the drawings two knives are shown, each being of the conventional triangular type, and each knife is held to slide between two guard-fingers 58, and upon the inner face of each of the guard-fingers a knife 58$^a$ is fixed, the said knife being preferably convexed or more or less curved, as shown in Fig. 9.

At the outer side of the outer guard-finger of each knife an upright 59 is secured to the frame in any suitable manner, and between the inner guard-fingers a substantially rectangular frame 60 is erected upon the platform-frame B or any extension therefrom, and the said guard-fingers and likewise the knives that pass between them are located between gathering-jaws E. These gathering-jaws consist of two vertical plates 61, which are secured the outer jaws to the standards 59 and the inner jaws to the frame 60, as shown in Fig. 2. The forward edges of the jaws are inclined downwardly and forwardly from their upper ends, and the lower extremities of each pair of jaws are curved outward in opposite directions, and the members of the jaws, namely, the plates 61, are so arranged that they converge at their inner ends or where they are adjacent to the sickle-knives 57.

The curved forward ends of the gathering-jaws are adapted to lift up any cornstalks that may have fallen to the ground or that are not in a substantially vertical position, and the inward convergence of the jaws is designed to pack the stalks somewhat tightly between the inner portions of the jaws, so that the knives at that point may readily cut them. The stalks will be severed to a greater or less degree by the fixed knives 58$^a$. Therefore the reciprocating or sickle knives 57 will not have as much work to perform as in the ordinary construction of harvester.

In the left-hand standard 59 a vertical shaft 62 is journaled, being provided at its lower end with a beveled gear 63, meshing with a gear 64, located on the forward end of the guide-shaft 14 of the platform conveyer. Two vertical shafts 65 and 66 are journaled in the frame 60 between the intermediate members of the gathering-jaws, and the shaft 66 is provided with a beveled gear 67, which meshes with a gear 68, located on the forward end of a shaft 68$^a$, journaled in the platform-frame B beneath the platform, as illustrated in dotted lines in Fig. 1. A fourth shaft 69 is journaled in the right-hand standard 59, and this shaft is provided with a beveled gear 70, which meshes with a like gear 71, located on the lower shaft 32 of the left-hand section of the elevator, which section is the front section of said elevator, and the right-hand section is the back section. Each of the vertical shafts 62, 65, 66, and 69 is provided with two sprocket-wheels 72 and 73, preferably adjustably secured thereon, and opposite the aforesaid sprocket-wheels 72 and 73 horizontal openings are made in the members of the gathering-jaws, the upper openings being designated as 74 and the lower openings as 75, as is best shown in Figs. 2 and 6.

In the upper openings 74 of the members of the gathering-jaws two or more vertical spindles 76 are located, while in the lower openings 75 spindles 77 are placed. The upper spindles 76 are made to journal small sprocket-wheels 78, and the lower spindles 77 carry in like manner sprocket-wheels 79. The sprocket-wheels are so placed that they extend in a graduated manner beyond the back faces of the members of the jaws, the innermost of the small sprocket-wheels being about centrally located in the slots or openings 74 and 75, as is best shown in Fig. 1.

An endless chain 80 is passed around the upper sprocket-wheel 72 of each of the shafts 62, 65, 66, and 69 and around the upper sprocket-wheels 78, located in the members of the jaws adjacent to which the shafts are placed, and a second belt 81 is passed around the lower sprocket-wheel 73 of each of the said shafts and around the lower sprocket-wheels in the members of the gathering-jaws near which the shafts are located. Owing to the graduated position of the sprocket-wheels in the gathering-jaws and the preponderance of the said wheels being back of the said jaws the inner stretches of the endless chains travel quite close to the inner stretches of the gathering-jaws, and the opposing belts or chains converge at the inner portion of the said jaws and opposite the knives intended for cutting the stalks. The chains 80 and 81 are feed-chains, being adapted to assist in the conveying of the stalks to the knives, and to facilitate the action of these feed-chains they are provided with projections upon their outer faces adapted for engagement with the stalks, as clearly shown in Fig. 1.

Braces 82 are located at the front central portion of the main frame, being adapted to hold the inner members of the jaws in proper position, and a brace 83 is provided for the extreme right-hand member of the jaws E, the said brace being also secured to the main frame, while the extreme left-hand member of the jaws is supported by the extension 17$^a$ of the strap 17 at the left-hand end of the frame. A reel 84 is mounted upon the upper end of each of the shafts 62, 65, 66, and 69, and these shafts may therefore be termed "reel-shafts." Each reel comprises a hub and a series of curved arms radiating from the hub. The reels are so mounted upon their shafts that they may revolve without interfering one with the other, and the said reels revolve so that each two adjacent reels will turn in direction of each other, so that their arms will extend over the jaws, will engage with the tops of the cut corn, and will force the corn to lie substantially straight on the conveyer of the platform A. The left-hand reel-shaft, as heretofore stated, is driven from the guide-shaft of the platform conveyer, the right-hand reel-shaft being driven by the shaft 32 of the elevator, and one of the intermediate reel-shafts 66 is driven from the line-shaft 68$^a$. The other intermediate reel-shaft 66 is driven from the shaft 66 by securing on the latter shaft a gear 85 and securing on the shaft 65 a gear 86 of like size, two intermediate gears 87 being employed, one meshing with the gear 85 and the other with the gear 86, as shown in Fig. 2.

The line-shaft 68$^a$, which drives the reel-shaft 66, is provided at its rear end with a sprocket-wheel 88, connected by a chain belt 89 with a sprocket-wheel 90 on the driving-shaft for the platform conveyer, as is also shown in Fig. 1. The sickle-bar is given reciprocating movement through the medium of a lever 91, which is fulcrumed at or near its center upon the bottom of the platform A, and the forward end of this lever is pivotally connected with the sickle-bar at or near its center and extends outward through an opening 92 in the front of the main frame B, as shown in Fig. 2. The rear end of the lever is made to pass out through an opening 92$^a$ at the back of the main frame, as shown in Fig. 3, and, as illustrated in Fig. 1, the rear end of the said lever 91 is connected with a pitman 93, which in its turn is connected with a crank-arm 94 on the line-shaft 42. The driver's seat 95 is placed at any convenient point, as is likewise the pole 96, the pole being shown as secured to the main wheel-frame B' and the driver's seat to the front side portion of the elevator C.

A platform F is employed for the shocker G, which platform is adapted for removable engagement with the main wheel-frame B' of the harvester. The shocker-platform F may be of any desired shape. Preferably, however, it is somewhat rectangular and is provided at its rear end with a recess 98, preferably of semicircular form. A bar 99 is made to extend across this recess a predetermined distance from the back, and the central portion of the upper face of the said bar has a transverse depression 99$^a$ made therein, as shown in Fig. 7. The purpose of the depression 99$^a$ will appear in connection with the shocker, to be hereinafter in detail described. A bracket 100 is projected rearwardly from the aforesaid cross-bar 99, and the said bracket carries an upwardly-extending pin 101, the bracket and pin being fixed. A rock-shaft 102 is pivoted in the said platform at the rear of its recessed portion, as is best shown in Fig. 7. The said rock-shaft at its outer end is provided with a ratchet-wheel 103, attached thereto or integral therewith, and a crank 104, which may be removably connected with the shaft and the ratchet-wheel 103, is adapted to be engaged by a pawl 105, (likewise shown in Fig. 7,) which pawl permits the rock-shaft to turn in one direction while it is in engagement with the ratchet-wheel of the shaft; but the movement of the shaft in the opposite direction is effectually prevented until the pawl is released.

A depression 107 is made in the upper face of the forward end portion of the platform F, and the said depression is normally covered by a plate 106, and the said plate is preferably provided with an embossed surface 108 upon its upper face, the said embossed surface being usually of circular form. The plate is provided with pivots or trunnions 109 at its ends, and the said trunnions or pivots have sliding movement in slots 110, made in the side beams of the platform, as shown in Figs. 4 and 5, so that one end of the plate may be adjusted farther outward or inward than the opposing end, if desired. This plate is adapted to be carried up against the shocker G to an engagement with the butts of the stalks contained therein for the purpose of straightening the said stalks at their butts, and the embossed portion 108 of the plate will cause a hollow to be made in the butt portion of the shock, thereby enabling the shock to stand better in an upright position than when the bottom is perfectly straight, and the reason for making the plate adjustable at its ends is that the plate may present an inclined face to the butts of the shocks and in so doing arrange the bottoms or butts of the shocks in an inclined plane, adapting the shock to stand in an upright manner upon a hillside without danger of the shock tumbling over. The nuts of the trunnions 109 will serve to hold said trunnions in adjusted position, at the same time allowing the plate 106 to have the necessary movement.

One or more springs 111 are located in the depression 107, the free ends of the springs engaging with offsets 112, projected downward from the hinged portion of the shaping-plate, and the springs so act, as shown in Figs. 4 and 5, as to hold the shaping-plate in its horizontal position when closed over the depression 107, and likewise hold it in its vertical position when opened up for engagement with the shock.

At one side of the recess 98 of the platform, upon the top thereof, a segmental angle-plate 113 is firmly secured, the said angle-plate forming, together with the marginal portion of the slot below the plate, a slideway, and at the opposite side of the said recess a second angle-plate 114 is secured, also of a segmental shape; but this latter angle-plate presents an inclined upper surface, being highest at its rear end and being practically flush with the upper face of the platform at its forward or inner end. A groove 115 is made in the marginal wall of the recess 98 below the inclined angle-plate 114, the said groove being exceedingly shallow where it connects with the lower portion of the plate and increases in depth until it reaches a central point at the rear of the recess 98, as shown at 116 in Figs. 4 and 5, the groove in the platform being shown in dotted lines in Fig. 7 and in positive lines in Fig. 5. In fact, the groove 115 forms a continuation of the downward and forward inclination of the plate 114.

A recess 117 is made in the rock-shaft 102 of suitable dimensions and shape to receive the bracket 100 and the pin 101, as shown in Figs. 4 and 5, and what is normally the top central surface of the rock-shaft is flattened and has an inclination in a rearwardly direction, as shown in Fig. 5, being provided with a wear-plate 118, having a slot 119 in that portion of the said plate which extends over the recess 117 in the rock-shaft.

The shocker G comprises a bottom plate or board 120 and two jaws 126 and 126ª, having a pivotal connection 127 with opposite sides of the said bottom plate. The jaws 126 and 126ª constitute the side portions of the shocker, and are preferably of less length than the bottom plate or board 120, being substantially flush, however, with the outer end of the said board, as shown in Fig. 4. These two jaws 126 and 126ª are inclined, being widest at what is normally their outer ends, and the space between the outer end portions of the jaws is considerably greater than that between their inner end portions. Therefore the entire shocker may be said to be somewhat of tapering form, the wider end being adapted to receive the butt portions of the stalks.

A wear-plate 121 is secured upon the bottom board of the shocker, as shown in Fig. 8, being adapted to bear against the wear-plate 118 of the platform, as shown in Figs. 4 and 5, and a pivot-pin is passed through the wear-plates, the said pin being loosely mounted in the said bottom plate and likewise in the surface of the rock-shaft covered by its wear-plate 118. The bottom plate or bar of the said shocker terminates at the contracted end of the shocker in a handle 122, and at the opposite end of the shocker a lip 123 is formed upon the lower portion of the bottom plate, as shown in Fig. 8. A spring-controlled latch-pin 124 or its equivalent is loosely contained within a recess 124ª, made in the bottom portion of the said bottom plate or board 120 of the shocker, and a suitable opening is made in the wear-plate 121 for the latch-pin to project downward through it, and when this opening in the plate 121 is in registry with the opening 119 in the wear-plate of the platform, which will be when the shocker is in position to dump its load, the latch-pin will extend through the recess 119 and will engage with the pin 101 on the bracket of the cross-bar of the platform, holding the shocker firmly in desired position; but the pin may be released from locking engagement with the wear-plate 118 by simply pressing downward on the handle 122 of the shocker, which will cause the bracket-pin 101 to press the latch upward, and, as the bottom of the said latch is curved, when the shocker is carried in direction of one side or the other it will readily ride up upon the said plate 118.

A transverse groove 125 is made in the bottom of the shocker between its handle 122 and the latch-pin 124, and this groove has the wall facing the larger end of the shocker undercut, as shown in Fig. 5, and as the shocker is turned the angled plate 113 is received within the groove 125, and the said plate thereupon serves to guide the shocker as it is shifted on the platform, as when the shocker is to receive the stalks its wider end faces the front, and when the shocker is in position to dump the shock the said wider end is made to face the rear. When the shocker is carried to receiving position, as shown in Fig. 4, the tongue 123 will have traveled beneath the inclined plate 114 and down the inclined groove 115 until its lip shall have reached the lowest point of the groove, which is at 116, as shown in Fig. 4. The purpose of the depression 99$^a$ in the bar 99 is to provide a space into which the end of the bottom plate 120, which end has the tongue 123, may move as the bottom plate is turned to the position shown in Fig. 4, such figure also showing the manner in which the depression 99$^a$ receives the bottom plate 120.

As the tongue portion of the shocker descends the rock-shaft 102 tilts proportionately in a forwardly direction, since the pole 96 does not interfere with such movement. Therefore when the shocker is in position to receive the cornstalks it has a decided forward and downward inclination, so that the butts of the stalks will be brought to an engagement with the shaping-plate 106 when the said plate is elevated. The shocker in its receiving position is immediately under the auxiliary shocker D, forming a portion of the harvester proper.

The jaws 126 and 126$^a$ of the shocker are supported in their open position by means of curved arms 128, which are projected from the sides of the bottom portion of the shocker and are adapted to engage with the under faces of the jaws, and at or near the handle end of the bottom section of the shocker an upwardly-curved arm 129 is secured at each side of the said bottom section, being adapted to receive the tassel or head portions of the cornstalks, and a binding thread or cord is adapted to be carried around the shock between the surrounding arms 129 and the opposing edge of the shocker.

At the upper edge of the shocker-jaw 126 a sleeve 130 is formed, extending practically from end to end, and the said sleeve is provided near each end with an angled slot 131, the vertical portions of the slots being upon the inside of the sleeve and the horizontal portions upon the top or near the outer side, as shown in Figs. 4, 8, and 11, and an opening is made in the sleeve, as shown in Fig. 8, between the angular slots or openings 131, exposing a portion of a shaft 132, which is loosely mounted in the sleeve 130 and is adapted to have end movement therein. Pins 133 are secured upon the aforesaid sliding shaft 132, the pins corresponding in number and in location to the angular slots or openings 131, in which they are adapted to have movement. The shaft, in addition to having sliding movement, will also have a rocking movement in its bearings. The sliding movement is imparted to the shaft by means of a shifting lever 134, which is fulcrumed upon the back or outer face of the jaw 126 of the shocker, as shown in Figs. 4 and 8, the shifting lever being loosely connected with the said shaft, so as not to interfere with its rotation. When the pins 133 of the shaft are in the longitudinal portions of the angular slots 131, the shaft cannot turn; but when the shaft has been shifted to bring the aforesaid pins opposite the vertical portions of the said slots the shaft will be free to turn a distance corresponding to the length of the vertical sections of the slots.

A sleeve 135 is likewise formed upon the upper edge of the opposing jaw 126$^a$ of the shocker, and within this sleeve a shaft 136 is mounted to revolve. This shaft is not intended to have end movement, and extends beyond each extremity of the aforesaid jaw, as shown in Figs. 5 and 8. The sleeve is provided with openings 137, corresponding in location to the angular slots 131 in the sleeve of the opposing jaw. The openings 137 in the sleeve 135 expose the shaft 136. A central opening 138 is likewise formed in the sleeve 135, and at this opening a ratchet-wheel 139 is secured upon the said shaft, the jaw 126$^a$ of the shocker being cut away sufficiently to permit the ratchet-wheel to turn, as shown in Fig. 5. A spring-pawl 140 is normally in engagement with this ratchet-wheel, being secured to the outer or under face of the said jaw 126$^a$, as shown in Figs. 7 and 8, and the outward movement of the spring-pawl is limited by a strap 142, the pawl being carried out of engagement with the ratchet-wheel, when desirable, by means of any suitable device, a lever 143 being provided for that purpose in the drawings. The shaft 106 is adapted to be revolved by means of a crank 144, which is preferably removably placed upon the squared end of the shaft located at the wider end of the shocker.

A spring-cleat 145 or a cleat of any description is preferably secured upon the upper face of the bottom section of the shocker between what may be termed the "head-arms" 129, as shown in Figs. 1 and 4, and another cleat 146 is preferably placed upon the head end of the shaft 136, which may be termed the "winding-shaft." These cleats are adapted to hold the cord in the position intended for binding the shock.

The jaws are drawn together through the medium of ropes, cables, or chains 147, which are secured to the winding-shaft where it is exposed at the openings 137, and links 148 at the opposite ends of these cords or cables are adapted to be passed over the pins 133 of the shocker-jaw 126.

The shocker attachment is removably connected with the frame of the harvester, and this attachment may be made, as shown in the drawings, by providing brackets 149 at the inner side of the shocker-platform F, which brackets are adapted to enter sockets 150, secured upon the extension-frame B' of the harvester, as shown in Figs. 2 and 4, the brackets being removably held in the sockets in any approved manner. A hanger 151 is preferably secured to the under face of the inner side beam of the shocker-platform, and the said hanger carries a small wheel 152, which wheel when the shocker is in operation or is attached to the harvester is out of contact with the ground, the outer side of the shocker-platform being supported by a ground-wheel 154, journaled in a suitable hanger 153, located at that side of the platform, as shown particularly in Fig. 2.

In the operation of the harvester and the shocker, as heretofore stated, the cornstalks are received between the gathering-jaws E, being guided by the said jaws and the directing-belts 80 and 81 to the knives, where the stalks are severed a proper distance from the ground, the reels acting to deliver the stalks in proper order on the conveyer-belts 22 of the harvester-platform. These belts carry the stalks to the elevator, where the stalks are taken up by the opposing stretches of the belts of the two sections of the elevator and are carried up between these sections to the top of said elevator, where they are delivered upon the auxiliary-shocker platform D, which is inclined downward or opened out, as shown in Fig. 3. Before starting the harvester in beginning work the shocker is turned around upon its platform in a manner to present its wide end to the front of the machine, as shown in Fig. 4, having the downward inclination, also shown in the said figure. The shocker will then be almost below the auxiliary shocker D and will receive the stalks therefrom, the attendant standing at the front portion of the shocker-platform facing the shocker. The binding-cord 40 is placed in position at the head end of the shocker, which will be facing the rear of the machine. When a sufficient quantity of stalks has been received in the shocker to form a shock of suitable size, the machine may be stopped until the shocker has been reversed upon its platform, which is accomplished in the manner heretofore set forth, or the machine may be permitted to go ahead and the lower member 36 of the auxiliary shocker be thrown upward at an angle to its upper member 36ᵃ to receive and retain the stalks cut during the operation of manipulating the main shocker. After the shocker has been turned around with its larger end facing the back of the machine, as shown in Fig. 5, it will be locked in that position against lateral movement by means of the latch 124. The cables 147 are then carried from the winding-shaft with which they are connected, and their links 148 are passed over the pins 133 on the opposing jaw of the shocker, the pins being at that time in the horizontal portions of the slots in which they move, as shown in Fig. 4. The crank 144 is then turned, winding the cables 147 on the winding-shaft and compressing the stalks between the jaws, and this winding operation is continued until a shock has been obtained having the desired solidity. The binding-cords are then tied around the shock. The shock is now ready to be dumped, and the machine is stopped and the pawl 105, controlling the rock-shaft 102, upon which the shocker is mounted, is relieved from engagement with the said shaft, whereupon the weight of the shock in the shocker will automatically overbalance the latter, and the shock will therefore be dumped, and as the shocker dumps its load the shifting lever 134 is operated to bring the pins 133 to the vertical portions of the slots in which they move, the pawl 140 being at the same time carried out of engagement with the ratchet-wheel of the winding-shaft. The jaws of the shocker will now separate of themselves, the cables may be cast off from the pins, and the shock will remain in its upright position on the ground. The shocker is then reversed to receive another load, and the machine continues its operation of harvesting.

The crank 104, secured to the pivot or rock shaft of the shocker, is utilized to restore the shocker to its normal position.

The butts of the stalks may be trimmed up by the shaping-plate 106 either while the shocker is being filled and before the jaws are brought together, or the said shaping-plate may remain in position during the act of closing the jaws, if found desirable.

In the event that a narrow gate or a narrow passage is encountered which will not admit of the passage of the machine with the shocker attached the shocker may be disconnected from the harvester-section of said machine and connected by a chain or cable to the rear thereof, thus materially reducing the width of the machine. When the shocker-platform is thus placed at the back of the machine, it will be supported by both its ordinary supporting-wheel 154 and the smaller wheel 152. Of course the shocker-platform will have an inclined position while traveling forward, owing to the difference in diameter of the two supporting-wheels, but such inclination will not interfere with its proper progress.

Having thus described our invention, we claim as new and desire to secure by Letters Patent—

1. A shocker, a rock-shaft supporting the said shocker, the shocker being so arranged on the said shaft that the preponderance of the weight of a shock contained therein will be beyond one side of the center of the shaft, thereby effecting a dumping of the shocker by the weight of the said shock, a pivotal connection between the rock-shaft and the shocker, the connection being such that the shocker may be revolved upon the rock-shaft, and locking devices, substantially as shown and described, for locking the shocker on the shaft, and a locking device for the said shaft, as and for the purpose specified.

2. The combination, with a platform, a rock-shaft journaled therein, the said platform being provided with an upper segmental guide and an opposing inclined groove, of a shocker mounted upon the said rock-shaft and provided with a groove to receive the said guide, and an extension to travel in the said inclined groove, as and for the purpose specified.

3. The combination, with a platform, of a rocking support carried by the platform, a shocker rotatably mounted upon the rocking support, and a latch adapted to lock the rocking support to the shocker when the latter is in a predetermined position, as and for the purpose specified.

4. The combination, with a platform having a wheeled support, of a rock-shaft mounted in the said platform, a lever connected with the said shaft, and a locking device engaging with the shaft, a shocker pivotally mounted on the rock-shaft, and a latch connection between the rock-shaft and the shocker, as and for the purpose specified.

5. The combination, of a shocker, a support for the shocker and a pivoted shaping-plate capable of engagement with the butt-end of the shock contained in the shocker, the pivot of the shaping-plate being adjustable toward and from the shocker whereby to variously shape the base of the shocker, as and for the purpose specified.

6. A shocker, consisting of a bottom section, jaws having a hinged connection therewith, a winding-shaft supported by one of the jaws, pins mounted on a shaft to slide in the opposite jaw, the slideways for the pins being angular, and binding cables or bands attached to the winding-shaft and adapted for connection with the said pins, as and for the purpose specified.

7. A shocker, having a base, jaws hinged to the base, supports limiting the outward movement of the said jaws, a winding-shaft carried by one of the jaws, a ratchet-wheel secured upon the said shaft, a detent for the ratchet-wheel, pins on a shaft having sliding movement in the opposing jaw, being likewise capable of a rotary movement, and cables or bands connected with the winding-shaft and adapted for connection with the said pins, as and for the purpose set forth.

8. A shocker, the same consisting of a base or bottom and tapering jaws having a hinged connection with the said base or bottom, a winding-shaft carried by one of the jaws, pins secured to a shaft having sliding and rotating movement in the opposing jaw, a shifting device for the pins, and tie bands or cables attached to the winding-shaft and adapted for engagement with the aforesaid pins, as and for the purpose specified.

9. In a shocker, the combination of the bottom section thereof, jaws having a hinged connection with the said bottom section, a shaft mounted to turn in one of the jaws, the said shaft being provided with a ratchet, a detent attached to the jaw and engaging with the said ratchet, a lever controlling the said detent, a shaft having sliding and rocking movement in the opposing jaw, pins carried by the shaft and having movement in slots formed in the jaw, and a shifting lever connected with the said pin-carrying shaft, as and for the purpose specified.

10. The combination with a shocker-frame, of a rock-shaft mounted on the frame, a shocker having pivotal movement on the rock-shaft, a pivotally-mounted butt-plate carried by the shocker-frame and capable of movement upward to engage the butt of the shocker and of movement downward to rest on the frame, the butt-plate having an offset, and a spring carried by the shocker-frame and engaging the offset, the spring being capable of holding the butt-plate in a raised or lowered position, substantially as described.

11. The combination with a shocker-frame having a curved guide, of a rock-shaft mounted on the shocker-frame and a shocker pivotally carried by the rock-shaft and having a part movable within the guide of the frame, the shocker being capable of rocking with the rock-shaft and of movement in a semicircular line by which its disposition may be changed, substantially as described.

12. The combination with a shocker-frame, of a rock-shaft mounted on the frame, a shocker pivotally carried by the rock-shaft, a latch carried by the shocker, means engaging the latch whereby the shocker may be locked at a certain position on the rock-shaft, and a pin carried by the frame, the pin and latch being relatively located so that the latch may move with the shocker to engage the pin and be thus released from engagement with the rock-shaft, substantially as described.

13. The combination with a shocker-frame, of a rock-shaft mounted on the shocker-frame, a shocker pivotally carried by the rock-shaft, a spring-pressed latch carried by the shocker, a latch-plate fixed to the rock-shaft and projecting centrally and forwardly therefrom, with which latch-plate the latch may lock, and a pin carried by the shocker-frame and located adjacent to the latch-plate, the rock-shaft and shocker being capable of movement to engage the latch with the pin whereby to disengage the latch and latch-plate, substantially as described.

14. The combination with a body portion having a semicircular recess at its rear side, of a rock-shaft extending transversely across the rear of the recess and carried by the frame, and a shocker pivotally mounted on the rock-shaft, the pivot of the shocker being concentric to the arc-shaped edge of the recess, the shocker being capable of a movement with the rock-shaft, and of movement on the pivot and independently of the rock-shaft to change the position of the shocker, one end of the shocker having sliding connection with the arc-shaped edge of the recess as the shocker turns on its pivot, substantially as described.

15. The combination with a shocker-frame, of a shocker mounted thereon and a butt-plate having hinged connection with the body portion and capable of movement to engage the butt of the shocker, the hinged connection with the butt-plate being capable of movement toward and from the shocker whereby to change the angle which the butt-plate may have with reference to the shocker and thus regulate the form given the butt of the shock, substantially as described.

16. The combination with a shocker-frame, of a shocker mounted on the frame and comprising two pivoted jaws, one of which is formed with an angular slot, a shaft rockable and slidable on the jaw having the slot, a pin carried by the shaft and confined within the angular slot, a shaft revoluble on the remaining jaw, a flexible connection attached to the latter shaft and capable of connection with the pin, and means for operating the latter shaft, substantially as described.

17. The combination with a frame, of a rock-shaft mounted on the frame, a pin rigidly carried by the frame and adjacent to the rock-shaft, a base shocker-section pivotally mounted on the rock-shaft, jaws hinged to the base shocker-section, a spring-pressed latch carried by the base shocker-section, and a latch-plate fixed to the rock-shaft and coöperating with the latch of the base shocker-section, substantially as described.

MILLARD F. MYERS.
WILLIAM C. CHOATE.

Witnesses to signature of Millard F. Myers:
F. L. DEVOR,
J. S. WILLIAMS.

Witnesses to signature of William C. Choate:
SAMUEL GAINES,
H. H. HUBLER.